United States Patent [19]

Schiemann

[11] 4,337,286
[45] Jun. 29, 1982

[54] PLASTIC CONTAINERS, PARTICULARLY CANISTERS

[76] Inventor: Wolfram Schiemann, Hohenzollern Platz, 7140 Ludwigsburg, Fed. Rep. of Germany

[21] Appl. No.: 225,612

[22] Filed: Jan. 16, 1981

[51] Int. Cl.³ .......................... B32B 9/04; F16L 9/12
[52] U.S. Cl. ..................................... 428/36; 428/542
[58] Field of Search .................. 428/36, 542; 264/537, 264/538

[56] References Cited

U.S. PATENT DOCUMENTS

| | | | |
|---|---|---|---|
| 3,950,468 | 4/1976 | Rainville | 264/538 |
| 3,961,113 | 6/1976 | Marco | 428/542 |
| 4,045,604 | 8/1977 | Clabburn | 428/36 |
| 4,101,618 | 7/1978 | Aoki | 264/538 |
| 4,288,478 | 9/1981 | Kinoshita et al. | 428/542 |
| 4,657,609 | 11/1977 | Uhlig | 264/538 |

*Primary Examiner*—William R. Dixon, Jr.

[57] ABSTRACT

A canister blank has four injection molded side walls having bottom wall sections extending therefrom, which are arranged to be bent at right angles to the side walls to form the container bottom. The side walls have plastic ledges with triangular cross sections projecting at the transition region from the side walls to the bottom wall sections. One concave side of the triangle forms a continuation of the external surface when the bottom wall section is bent and the other concave side of the triangle forms a part of the container bottom when the bottom wall section is bent. The point of the triangle forms an outside edge at the bottom.

6 Claims, 4 Drawing Figures

U.S. Patent     Jun. 29, 1982     4,337,286
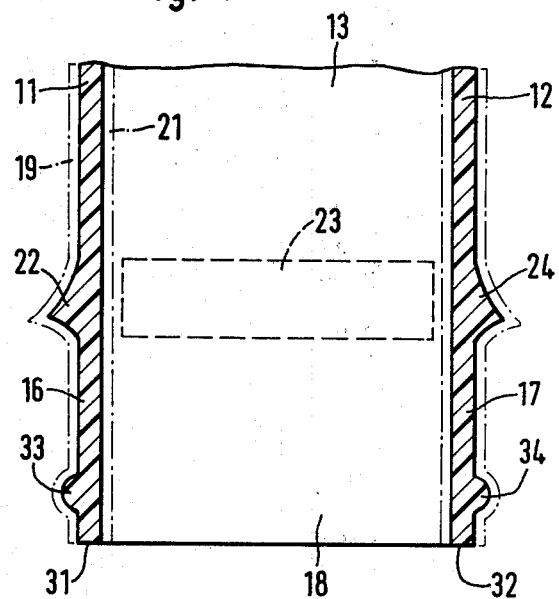
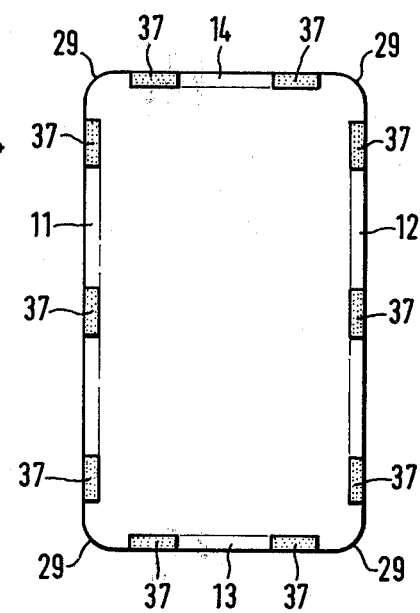
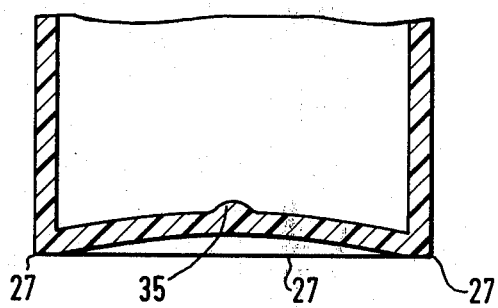
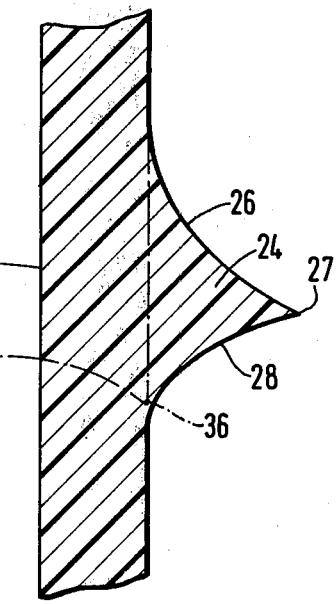

PLASTIC CONTAINERS, PARTICULARLY CANISTERS

The invention relates to a container blank according to which a container blank has four side walls and bottom wall sections extending from the side walls, which are arranged to be bent at approximately right angles to form the bottom of the container.

BACKGROUND OF THE INVENTION

Containers of this type have—as is customary with canisters—a very definite volume. Moreover, they also have a very definite shape which is for the most part flat rectangular. They are produced either from sheet metal in the form of deep-drawn parts or by injection molding or blow molding or by centrifugal casting, etc.

The conventional containers have the following shortcomings:

(a) Even sheet metal canisters have transition radii between the side walls and the bottom wall. The transition radius—which in the case of containers made of plastics is still larger, particularly when they are produced by blow molding or by centrifugal casting—gives away part of the volume which is no longer available to the container. This gets the designer into difficulties since the gross volume occupied by the container and any handles and pouring spouts which may be present should be as close as possible to the net volume.

(b) When, for example, a 5-1 canister or a 10-1 canister falls over, only relatively small masses are moved in that case. When, however, a 20-1 or a 30-1 canister falls over, the consequences may be serious. These containers have a considerable height, a width not quite as large and a very much smaller depth. When they fall over, they fall on their sides because they are least stable in this direction. This falling over is facilitated by the aforementioned radii because they shift the region farthest on the outside by about 20% of the canister depth toward the inside, with the canister depth being the smallest dimension to begin with.

(c) In the deep drawing of sheet metal but still more so in the blow molding of plastics, in centrifugal casting, etc., these radii are the places with the least material thickness. This is undesirable in many different respects: It is in the bottom region that the container is subject to the greatest wear and tear. But this is exactly the place where the material is thinnest. If the containers are used as gasoline canisters, certain minimum wall thicknesses must be maintained in order to safeguard the diffusion tightness of the container. Many testing regulations of various countries specify a minimum wall thickness. The way to live up to this specification is to overdimension the thickness of the other walls which results in the consumption of more material and also makes the container heavier.

Object and Statement of the Invention

It is the object of the invention to specify a way of avoiding the above shortcomings in an economical and practical manner.

This objective is achieved according to the invention by one or more plastic ledges, having an approximately triangular cross section which projects from the external surface of the side walls of the container blank in the transition region from the side walls to the bottom wall sections. The triangular cross sectional ledges have a first side which forms a continuation of the external surface of the side walls after the bottom wall sections are bent and a second side which forms a part of the bottom of the container after the bottom wall sections are bent. The point of the triangular cross section forms an outside edge at the bottom of the container.

Here, reference can be made to the method according to the German patent application No. P 30 08 737.7 (U.S. Pat. application No. 214,799, filed Dec. 9, 1980, entitled "Process for the Production of Canisters and Canisters Obtained Therewith". According to this method, the blank is first injection molded with its side walls and its upper portion and the bottom is then produced by bending a section which extends beyond the side walls.

Advantageously, the invention includes the following additional features:

The blank is a canister blank. The measures according to these features are particularly important because especially in the case of canisters the problem of the optimal base plays a large part. They must, for example, still not begin to slide when they stand on a plane inclined at a specified angle. Moreover, particularly in the case of these canisters there arises the problem of the diffusion tightness if they are used as gasoline canisters.

The material ledges are provided at the two long sides of the blank. Through these features the danger of toppling is reduced in the very direction in which such a container, for example, a canister, is most likely to topple.

The triangular sides are concave areas. These features make it possible that the triangular areas are level after the bending over of the wall sections extending beyond the side walls and are in alignment with the side walls or with that portion of the bottom on which the canister rests.

The ledge is provided without interruption along the entire length of the long sides. Through these features the above mentioned advantages are attained along the entire length of the side walls.

Near the free edge of the bottom wall section in two of the bottom wall sections lying opposite each other a material accumulation is provided for the subsequent welding of the bottom seam. Through these features there is created, through a material accumulation provided for in advance, the amount of material intended for the welding of the bottom seam. Even at this bottom seam weld the containers are sometimes thinnest, after their fabrication, and, therefore, weakest in material and susceptible to the diffusion of gasoline, etc.

DESCRIPTION OF AN EMBODIMENT

The invention will now be described with the aid of preferred examples of realization. On the drawing, FIG. 1 shows the lower region of the blank with a section through the side walls in a first processing phase;

FIG. 2 is a view similar to FIG. 1, but after a second processing phase;

FIG. 3 is the bottom view of FIG. 2;

FIG. 4 shows a greatly enlarged region around the material ledge after a first process step and (broken lines) after a second process step.

A 20-1 canister has in the region not shown in FIGS. 1 and 2 the customary handles and the pouring spout. Such a canister is, for example, 47 cm high, 34 cm wide and 16 cm deep. The blank shown in FIG. 1 has accordingly side walls 11,12 of corresponding length, transverse walls 13,14 and wall sections extending beyond these side walls, in which case the wall section 16 extends the side wall 11, wall section 17 extends side wall 12, wall section 18 extends transverse wall 13 and another wall section (not shown) extends the transverse wall 14. In this case, the wall sections may be the linear continuations of the side walls or the transverse walls, as shown in FIG. 1, or they may also extend funnel-like slightly toward the outside, as shown in the older patent application. After the injection molding or else simultaneously with it, additional layers 19 may be applied to the side walls, transverse walls and wall sections on the outside and/or additional layers 21.

In the transition region between the side walls and the transverse walls on the one hand and the wall sections on the other one material ledge each 22,23,24, projecting toward the outside, is provided. All these material ledges have an approximately triangular cross section with an upper concave triangular surface 26 which after a peak 27 changes into a lower concave triangular surface 28. The triangular surface 26 is wider than the triangular surface 28. As shown in FIG. 1 in conjunction with FIG. 3, the material ledges 22,23,24 do not extend as far as radii 29 at which the side walls 11,12 and the transverse walls 13,14 meet. They rather stop short of the radii 29.

Shortly ahead of the lower edge 31,32 of the wall sections 16,17 an accumulation of material projecting toward the outside 33,34 is provided which has the shape of a half-round ledge projecting toward the outside.

In the further processing of the blank according to FIG. 1, said blank is—as is sometimes also done in the case of blow-molded blanks—set inside another heated processing mold after the plastic material of the injection-molded blank has been heated to the plasticizing temperature. In this mold, the lower wall sections 16,17,18 (and also the wall section—not shown in FIG. 1—parallel to the wall section 18) are then folded inward to form the bottom.

The folding in and squashing off in the manner also familiar from the blow-molding process is in the case of the present invention done in the region of material ledges 22,23,24 so that these, after the inward bendings, form with their peak 27 the outer base edge of the canister situated completely on the outside. In this case, the wall sections 16,17,18 (and the wall section not shown) are squashed off in the region of the material accumulation 33,34, so that only a slight thickening 34 remains.

Depending on the shape of the triangular areas 26,28 and of the peak 27, different standing areas are obtained in the peripheral region. Since the triangular areas 26,28 are dissimilar in width, a well-developed sharp, slip-resistant edge 36 will be formed in the case of a construction according to FIG. 4. How concave the triangular areas 26,28 have to be is determined by trial and error. If they are concave, they are in any event pulled straight after the bending over.

When the width of the triangular areas 26,28 is the same, then instead of the pronounced edge 36 a somewhat larger base area is obtained.

It should be pointed out that the bottom of the canister as a whole is arched toward the interior, as is shown in FIG. 2, so that as much as possible only the outermost regions contribute to the standing area.

It is not necessary that the material ledges 22,23,24 be continuous. It is sufficient when these ledges are provided in partial sections so that more or less numerous little pedestals 37 are formed whose area is dotted in FIG. 3

I claim:

1. Container blank composed of plastic material comprising:

four injection molded side walls having external surfaces, bottom wall sections extending from said side walls, said bottom wall sections being arranged and adapted to be bent approximately at right angles to said walls at a predetermined transition region to form the bottom of the container, a plastic ledge, having an approximately triangular cross section, projecting from said external surface of said side walls in said predetermined transition region, said ledge having a first side of said triangular cross section which forms a continuation of said external surface of said side wall after said bottom wall section is bent and a second side of said triangular cross section which forms a part of the bottom of the container after said bottom wall section is bent, and a point of said triangular cross section at which said sides coverage forming an outside edge at the bottom of the container.

2. Container blank according to claim 1, wherein said blank is a canister blank.

3. Container blank according to claim 1, wherein said blank has two long side walls and said triangular ledges are provided at said two long side walls.

4. Container blank according to claim 1, wherein said sides of said triangular ledges are concave.

5. Container blank according to claim 3, wherein said triangular ledge is provided without interruption along the entire length of said long sides.

6. A container blank according to claim 1 comprising a material accumulation in two bottom wall sections lying opposite each other, near the free edge of said bottom wall sections, for welding a bottom seam.

* * * * *